United States Patent
Gao

(10) Patent No.: US 9,910,183 B2
(45) Date of Patent: Mar. 6, 2018

(54) HIGH PRECISION FIELD MEASUREMENT METHOD FOR GEOMAGNETIC VECTORS AND A DEVICE THEREOF

(71) Applicant: China Metallurgical Geology Bureau Geological Exploration Institute of Shandong Zhengyuan, Jinan, Shandong (CN)

(72) Inventor: Jiandong Gao, Shandong (CN)

(73) Assignee: CHINA METALLURGICAL GEOLOGY BUREAU GEOLOGICAL EXPLORATION INSTITUTE OF SHANDONG ZHENGYUAN, Shandong (CN)

( * ) Notice: Subject to any disclaimer, the term of this patent is extended or adjusted under 35 U.S.C. 154(b) by 112 days.

(21) Appl. No.: 14/906,434

(22) PCT Filed: Jun. 9, 2014

(86) PCT No.: PCT/CN2014/079467
§ 371 (c)(1),
(2) Date: Jan. 20, 2016

(87) PCT Pub. No.: WO2015/014161
PCT Pub. Date: Feb. 5, 2015

(65) Prior Publication Data
US 2016/0154135 A1    Jun. 2, 2016

(30) Foreign Application Priority Data

Jul. 30, 2013  (CN) .......................... 2013 1 0324884

(51) Int. Cl.
*G01V 3/00* (2006.01)
*G01V 3/40* (2006.01)
(Continued)

(52) U.S. Cl.
CPC .............. *G01V 3/40* (2013.01); *E21B 10/00* (2013.01); *G01V 1/00* (2013.01); *G01V 2200/00* (2013.01)

(58) Field of Classification Search
CPC ........ G01V 1/00; G01V 2200/00; E21B 1/00; E21B 10/00; E21B 15/00; E21B 43/00; G01R 1/00
See application file for complete search history.

(56) References Cited

U.S. PATENT DOCUMENTS 3,114,103 A * 12/1963 Serson ................... G01R 33/24
                                                                324/301
5,126,669 A *  6/1992 Honess .................. G01R 33/12
                                                                324/205

(Continued)

FOREIGN PATENT DOCUMENTS

CN        1057113 A     12/1991
CN        2476826 Y      2/2002
(Continued)

*Primary Examiner* — Jermele M Hollington
*Assistant Examiner* — Temilade Rhodes-Vivour
(74) *Attorney, Agent, or Firm* — Han IP Corporation; Andy M. Han

(57) ABSTRACT

A tripod, a vertical coil and a total-field magnetometer are utilized to measure a geomagnetic field $T_0$ without an additional magnetic field imposed, as well as two composite magnetic field values $T_{-1}$ and $T_{-2}$ when the geomagnetic field is added with a vertical upward magnetic field $T_f$ and a double vertical upward magnetic field $2T_f$, respectively. Calculate a vertical component Z, a horizontal component H and a geomagnetic inclination I of the geomagnetic field. Set up a horizontal coil such that a geometric center of the horizontal coil coincides with a geometric center of the vertical coil. Use the total-field magnetometer to measure two composite magnetic field values $T_{+\|}$ and $T_{-\|}$ after the geomagnetic field has been added with a horizontal forward magnetic field and a horizontal reverse magnetic field, respectively. Calculate a geomagnetic declination D.

8 Claims, 4 Drawing Sheets

(51) Int. Cl.
*G01V 1/00* (2006.01)
*E21B 10/00* (2006.01)

(56) References Cited

U.S. PATENT DOCUMENTS

| | | | | |
|---|---|---|---|---|
| 5,323,855 A | * | 6/1994 | Evans | E21B 43/2401 166/248 |
| 5,982,176 A | * | 11/1999 | Kawamura | G01C 17/30 324/247 |
| 2011/0181290 A1 | * | 7/2011 | Kuzmin | G01V 3/17 324/331 |
| 2012/0059585 A1 | * | 3/2012 | Kjerstad | G01V 3/12 702/6 |
| 2013/0038321 A1 | * | 2/2013 | Suzuki | G01R 35/00 324/224 |

FOREIGN PATENT DOCUMENTS

| | | |
|---|---|---|
| CN | 1553218 A | 12/2004 |
| CN | 103389517 A | 11/2013 |
| CN | 103941299 A | 7/2014 |
| CN | 103941300 A | 7/2014 |
| EP | 2306215 A1 | 4/2011 |
| JP | 2002202129 | 7/2002 |

* cited by examiner

HIGH PRECISION FIELD MEASUREMENT METHOD FOR GEOMAGNETIC VECTORS AND A DEVICE THEREOF

CROSS-REFERENCE TO RELATED APPLICATION

This application is the U.S. national stage application of International Application No. PCT/CN2014/079467, filed on Jun. 9, 2014. The above-identified patent application is hereby incorporated by reference in its entirety.

TECHNICAL FIELD

The present invention concerns the technical field of fine measurement of the geomagnetic field in physical geography, and in particular relates to a high precision field measurement method for geomagnetic vectors as well as a device thereof.

BACKGROUND

Geomagnetic vector measurement can effectively reduce the non-uniqueness of inversion in geophysical investigation and contribute to the qualitative and quantitative interpretation to magnetic substances. At present, the field geomagnetic measurement instruments generally adopted by geophysical prospecting workers at home and abroad include common proton magnetometers, optical pump magnetometers or Overhauser proton magnetometers. These magnetometers are convenient for use in the field, with the measurement accuracy equal or superior to 1 nT, and able to measure the scalar value of total geomagnetic intensity. However, the total-field magnetometer cannot measure the vectors of geomagnetic field. For field measurement of geomagnetic vectors, it is confined to using flux gate three-component magnetometers with lower accuracy of measurement error as large as several tens of nT. Such kind of magnetometers does not meet the requirements of professional geophysical investigation. The commercially available didD vector magnetometer, which is provided by CEM Corporation (Canada), represents the international advanced level of geomagnetic vector measurement. The measuring method adopted by didD vector magnetometer is described as follows: mount two sets of mutually orthogonal coils on the probe of a high precision total-field magnetometer, with the axial lines of the orthogonal coils normal to the geomagnetic field vector F in the horizontal plane and the meridian plane; firstly, record the total magnetic field T when bias current is not applied; subsequently, input in turn bias currents which are equivalent in value and opposite in direction in the coil whose axial line is normal to T in the meridian plane, namely the magnetic inclination (I) coil; record the composite magnetic fields resulted from the combination of the magnetic deflection field generated by these two bias currents and the geomagnetic field, which are called Ip and Im; in the same manner, input bias currents which are equivalent in value and opposite in direction in the coil whose axial line is normal to T in the horizontal plane, namely the magnetic declination (D) coil; record the composite magnetic fields resulted from the combination of the magnetic deflection field generated by these two bias currents and the geomagnetic field, which are called Dp and Dm; then, through calculation, determine the changes dI and dD in the inclination (I) and declination (D) of T (http://www.gemsys.ca/products/vecrot-magneromerets/). In the process of the measurement, it is not necessary for dIdD vector magnetometers of GME Corporation to make complete compensation to the geomagnetic components, so that the device is relatively handy. However, it is necessary to adjust in advance the axial lines of the orthogonal coils on the probe to the position to be normal to the geomagnetic vector T to be measured in the horizontal plane and the meridian plane, so the installation, adjustment and preparation of the instruments are complicated and nontrivial, and thus such instruments can only be used to measure deviation variations of geomagnetic inclination I and declination D with time in stationary Seismological and Geomagnetic observation stations. Therefore the geomagnetic vector measurement devices and technologies in the prior art are not applicable to high precision measurement in the field ore-prospecting environment.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

It is the objective of the present invention to provide a high precision field measurement method for geomagnetic vectors and a device thereof.

The above-mentioned objective of the present invention is achieved through the following technical solution: a high precision field measurement method for geomagnetic vectors that may include using a tripod, a vertical coil and a total-field magnetometer, measure a geomagnetic field $T_0$ without an additional magnetic field imposed; measure two composite magnetic field values $T_{-1}$ and $T_{-2}$ when the geomagnetic field is added with a vertical upward magnetic field $T_f$ and is added with a double vertical upward magnetic field $2T_f$, respectively; and calculate a vertical component Z, a horizontal component H and a geomagnetic inclination I of the geomagnetic field as follows:

$$Z = \frac{T_{-2}^2 - 4T_{-1}^2 + 3T_0^2}{\sqrt{8(T_{-2}^2 - 2T_{-1}^2 + T_0^2)}}$$

$$H = \sqrt{T_0^2 - Z^2}$$

$$\cos(I) = \frac{H}{T_0}$$

Set up a horizontal coil, such that a geometric center of the vertical coil coincides with a geometric center of the horizontal coil; use the total-field magnetometer to measure two composite magnetic field values $T_{+\parallel}$ and $T_{-\parallel}$ after the geomagnetic field has been added with a horizontal forward magnetic field and a horizontal reverse magnetic field, respectively; and calculate a geomagnetic declination as follows:

$$\cos(D1) = \frac{T_{+\parallel}^2 - T_{-\parallel}^2}{T_0 \cos(I)\sqrt{8(T_{+\parallel}^2 + T_{-\parallel}^2 - 2T_0^2)}};$$

-continued

Geomagnetic declination $D = D0 - D1$:

wherein D0 is an included angle between an axial line of the horizontal coil and a geographical north direction, a known preset value.

The high precision field measurement method for geomagnetic vectors may include the following steps:

① Place a probe of the total-field magnetometer inside the vertical coil and mount the vertical coil on the tripod, wherein the vertical coil is a Helmholtz coil;

② Connect the vertical coil to an excitation power supply through a conducting wire, the excitation power supply provided with a wave-band switch thereon;

③ Adjust the switch on the excitation power supply such that the excitation power supply does not power on the vertical coil; and use the total-field magnetometer to measure the geomagnetic field $T_o$ without an additional magnetic field imposed;

④ Adjust the switch on the excitation power supply such that the excitation power supply reversely powers on the vertical coil with a current intensity I, generating inside the vertical coil the vertical upward magnetic field $T_f$; and use the total-field magnetometer to measure the composite magnetic field $T_{-1}$ of the magnetic field $T_f$ and the geomagnetic field;

⑤ Adjust the switch on the excitation power supply such that the excitation power supply reversely powers on the vertical coil with a current intensity 2I, generating inside the vertical coil the vertical upward magnetic field $2T_f$; use the total-field magnetometer to measure the composite magnetic field $T_{-2}$ of the magnetic field $2T_f$ and the geomagnetic field; and, using $T_o$, $T_{-1}$ and $T_{-2}$, calculate the vertical component Z, the horizontal component H and the geomagnetic inclination I of the geomagnetic field as follows:

$$Z = \frac{T_{-2}^2 - 4T_{-1}^2 + 3T_0^2}{\sqrt{8(T_{-2}^2 - 2T_{-1}^2 + T_0^2)}}$$

$$H = \sqrt{T_0^2 - Z^2}$$

$$\cos(I) = \frac{H}{T_0}$$

Mount the horizontal coil on the vertical coil such that the geometric center of the vertical coil coincides with the geometric center of the horizontal coil; place the probe of the total-field magnetometer at a location where the geometric centers of the two coils coincide, wherein the horizontal coil is a Helmholtz coil; use the total-field magnetometer to measure the composite magnetic fields wherein the geomagnetic field has been added with a horizontal forward magnetic field $T_{+\parallel}$ and a horizontal reverse magnetic field $T_{-\parallel}$; and calculate the geomagnetic declination as follows:

$$\cos(D1) = \frac{T_{+//}^2 - T_{-//}^2}{T_0 \cos(I)\sqrt{8(T_{+//}^2 + T_{-//}^2 - 2T_0^2)}}$$

Geomagnetic declination $D = D0 - D1$:

wherein D0 is the included angle between the axial line of the horizontal coil and the geographic north direction, a known preset value.

The high precision field measurement method for geomagnetic vectors may include the following steps:

① Place a probe of the total-field magnetometer inside the vertical coil and mount the vertical coil on the tripod, wherein the vertical coil is a Helmholtz coil;

② Connect the vertical coil to an excitation power supply through conductor conducting wire, the excitation power supply provided with a wave-band switch thereon;

③ Adjust the switch on the excitation power supply such that the excitation power supply does not power on the vertical coil; and use the total-field magnetometer to measure the geomagnetic field $T_o$ without an additional magnetic field imposed;

④ Adjust the switch on the excitation power supply such that the excitation power supply reversely powers on the vertical coil with a current intensity I, generating inside the vertical coil the vertical upward magnetic field $T_f$; and use the total-field magnetometer to measure the composite magnetic field $T_{-1}$ of the magnetic field $T_f$ and the geomagnetic field;

⑤ Adjust the switch on the excitation power supply such that the excitation power supply reversely powers on the vertical coil with a current intensity 2I, generating inside the vertical coil the vertical upward magnetic field $2T_f$; use the total-field magnetometer to measure the composite magnetic field $T_{-2}$ of the magnetic field $2T_f$ and the geomagnetic field; and, using $T_o$, $T_{-1}$ and $T_{-2}$, calculate the vertical component Z, the horizontal component H and the geomagnetic inclination I of the geomagnetic as follows:

$$Z = \frac{T_{-2}^2 - 4T_{-1}^2 + 3T_0^2}{\sqrt{8(T_{-2}^2 - 2T_{-1}^2 + T_0^2)}}$$

$$H = \sqrt{T_0^2 - Z^2}$$

$$\cos(I) = \frac{H}{T_0}$$

⑥ Mount a horizontal coil on the vertical coil such that a geometric center of the vertical coil coincides with a geometric center of the horizontal coil, and connect the horizontal coil to the excitation power supply, wherein the horizontal coil is a Helmholtz coil;

⑦ Adjust the switch on the excitation power supply such that the excitation power supply forwardly powers on the horizontal coil and generates a forward magnetic field; and use the total-field magnetometer to measure a composite magnetic field $T_{+\parallel}$ of the forward magnetic field of the horizontal coil and the geomagnetic field;

⑧ Adjust the switch on the excitation power supply such that the excitation power supply reversely powers on the horizontal coil and generates a reverse magnetic field; use the total-field magnetometer to measure a composite magnetic field $T_{-\parallel}$ of the reverse magnetic field of the horizontal coil and the geomagnetic field; and, using the measured values of $T_o$, $T_{-1}$, $T_{-2}$, $T_{+\parallel}$ and $T_{-\parallel}$, calculate a vertical component Z, a horizontal component H, a geomagnetic inclination I and a geomagnetic declination D of the geomagnetic field, as follows:

$$Z = \frac{T_{-2}^2 - 4T_{-1}^2 + 3T_0^2}{\sqrt{8(T_{-2}^2 - 2T_{-1}^2 + T_0^2)}}$$

-continued $$H = \sqrt{T_0^2 - Z^2}$$

$$\cos(I) = \frac{H}{T_0}$$

$$\cos(D1) = \frac{T_{+//}^2 - T_{-//}^2}{T_0 \cos(I)\sqrt{8(T_{+//}^2 + T_{-//}^2 - 2T_0^2)}}$$

Geomagnetic declination $D = D0 - D1$:

wherein D0 is an included angle between an axial line of the horizontal coil and a geographic north direction, a known preset value.

A device for high precision field measurement of geomagnetic vectors, comprising a tripod; a horizontal dial mounted on the tripod; a tumbler mounted on the dial; a fixed column mounted in the tumbler; a coil holder mounted on the fixed column; two half-shaft brackets mounted on the coil holder; two half-shafts each mounted at a top end of a respective one of the two half-shaft brackets; a vertical coil frame connected to each of the two half-shafts via a corresponding connecting plate; a horizontal coil frame connected with the vertical coil frame; a horizontal coil wound along the horizontal coil frame; a vertical coil wound along the vertical coil frame, with geometric centers of the vertical coil and the horizontal coil coinciding with each other; a coil excitation power supply connected to both the vertical coil and the horizontal coil through conducting wires; and a probe connected via a conducting wire to a total-field magnetometer, the probe mounted at a location where the geometric centers of the vertical coil and the horizontal coil coincide; a supporting plate mounted on the horizontal coil frame; two mutually orthogonal long glass level bubbles mounted on the supporting plate, with a plane on which the two long glass level bubbles are located parallel with a plane of the vertical coil; a rotating base mounted at an upper end of the horizontal dial and around an outer periphery of the tumbler, with an upper-end surface of the rotating base connected with the coil holder, and with a locking bolt mounted on a side surface of the rotating base, wherein the vertical coil frame and the horizontal coil frame mounted on the two half-shafts of the coil holder are mutually orthogonal, wherein the coil frames can vertically rotate by 180° around the horizontal half-shafts, and wherein the coil holder can horizontally rotate by 180° around the fixed column.

A high precision field measurement method for geomagnetic vectors may include the following steps:

① A tripod is mounted on an observation location; a horizontal dial is mounted on the tripod; a tumbler is mounted on the dial; a fixed column is mounted in the tumbler; a coil holder is mounted on the fixed column; two half-shaft brackets are mounted on the coil holder; each of two half-shafts is mounted at a top end of a respective one of the two half-shaft brackets; a vertical coil frame is connected to each of the two half-shafts via a corresponding connecting plate; a horizontal coil frame is connected with the vertical coil frame; a horizontal coil is wound along the horizontal coil frame; a vertical coil is wound along the vertical coil frame, with geometric centers of the vertical coil and the horizontal coil coinciding with each other; a coil excitation power supply is connected to both the vertical coil and the horizontal coil through conducting wires; a probe is connected via a conducting wire to a total-field magnetometer, and the probe is mounted at a location where the geometric centers of the vertical coil and the horizontal coil coincide;

② Adjust the tripod such that the vertical coil is in a vertical condition and the horizontal coil is in a horizontal condition, wherein an azimuth of the horizontal coil is D0, while both the vertical coil and the horizontal coil are Helmholtz coils;

③ Adjust a switch on excitation power supply such that the excitation power supply does not power on the vertical coil; use the total-field magnetometer to measure a geomagnetic field $T_o$ without an additional magnetic field imposed;

④ Adjust the switch on the excitation power supply such that the excitation power supply reversely powers on the vertical coil with a power supply intensity I, generating inside the vertical coil a vertical upward magnetic field $T_f$; and use the total-field magnetometer to measure a composite magnetic field $T_{-1}$ of the magnetic field $T_f$ and the geomagnetic field;

⑤ Adjust the switch on the excitation power supply such that the excitation power supply reversely powers on the vertical coil with a power supply intensity 2I, generating inside the vertical coil a vertical upward magnetic field $2T_f$; use the total-field magnetometer to measure a composite magnetic field $T_{-2}$ of the magnetic field $2T_f$ and the geomagnetic field; and, using $T_o$, $T_{-1}$ and $T_{-2}$, calculate a vertical component Z, a horizontal component H and a geomagnetic inclination I of the magnetic field as follows:

$$Z = \frac{T_{-2}^2 - 4T_{-1}^2 + 3T_0^2}{\sqrt{8(T_{-2}^2 - 2T_{-1}^2 + T_0^2)}}$$

$$H = \sqrt{T_0^2 - Z^2}$$

$$\cos(I) = \frac{H}{T_0}$$

⑥ Mount the horizontal coil on the vertical coil such that a geometric center of the vertical coil coincides with a geometric center of the horizontal coil, and connect the horizontal coil to the excitation power supply, wherein the horizontal coil is a Helmholtz coil;

⑦ Adjust the switch on the excitation power supply such that the excitation power supply forwardly powers on the horizontal coil and generates a forward magnetic field; and use the total-field magnetometer to measure a composite magnetic field $T_{+//}$ of the forward magnetic field of the horizontal coil and the geomagnetic field;

⑧ Adjust the switch on the excitation power supply such that the excitation power supply reversely powers on the horizontal coil and generates a reverse magnetic field; use the total-field magnetometer to measure a composite magnetic field $T_{-//}$ of the reverse magnetic field of the horizontal coil and the geomagnetic field; and, using the measured values of $T_O$, $T_{-1}$, $T_{-2}$, $T_{+//}$ and $T_{-//}$, calculate a vertical component Z, a horizontal component H, a geomagnetic inclination I and a geomagnetic declination D of the geomagnetic field, as follows:

$$Z = \frac{T_{-2}^2 - 4T_{-1}^2 + 3T_0^2}{\sqrt{8(T_{-2}^2 - 2T_{-1}^2 + T_0^2)}}$$

$$H = \sqrt{T_0^2 - Z^2}$$

$$\cos(I) = \frac{H}{T_0}$$

-continued $$\cos(D1) = \frac{T_{+//}^2 - T_{-//}^2}{T_0 \cos(I)\sqrt{8(T_{+//}^2 + T_{-//}^2 - 2T_0^2)}}$$

Geomagnetic declination $D = D0 - D1$:

wherein D0 is an included angle between an axial line of the horizontal coil and a geographic north direction, a known preset value.

The beneficial effects of the present invention include: The measurement method according to the present disclosure is applicable to geomagnetic measurement in middle- and high-latitude regions. To implement the measurement method according to the present disclosure, it is merely necessary to adjust the coils that generate additional magnetic fields to either a horizontal or a vertical state. The preparation work prior to observation is simple. The measurement method of the present disclosure is applicable not only to large-area rapid measurement of geomagnetic vectors in field geophysical investigation, but also to fixed-point observation in a permanent station with an improved measurement efficiency. For the measurement device of the present disclosure, it is only required to provide in a short period of time additional magnetic fields with values differing by one time and a direction opposite to the vertical component of the geomagnetic field. The required value of the additional magnetic field does not exceed 2000 nT, and it is not necessary to make fine compensation to the vertical component of the geomagnetic field. It is also not required to provide a high-power and stable current for a long period of time to the coils that generate the additional magnetic fields. With a low coil power consumption, the device is of light weight. The measurement device according to the present disclosure is not only applicable to field mobile measurement but also able to realize an obvious reduction in energy consumption for fixed-station observation. The present disclosure uses vertical and horizontal magnetic field coils along with a total-field magnetometer, able to rapidly measure various components of geomagnetic field vectors in a field environment, including vertical component Z, horizontal component H, inclination I and declination D, based on which components of geomagnetic field in any direction may be derived. Many geomagnetic vector parameters can thus be obtained. Prior to observation, it is merely necessary to make horizontal adjustment and direction adjustment to the coils. The preparation work prior to measurement is relatively simple. Therefore, the present invention is suitable for the fine measurement pertaining to the geophysical reconnaissance profile. The present disclosure employs a pair of mutually orthogonal magnetic field coils in coordination with a total-field magnetometer to measure various components of the geomagnetic field other than magnetic declination D, including vertical component Z, horizontal component H and inclination I. Prior to observation, it is merely necessary to make horizontal adjustment to the coils. The present disclosure is therefore applicable to large area rapid measurement in geophysical investigation and field reconnaissance. The accuracy of geomagnetic field vector measurement according to the present disclosure is positively correlated with the accuracy of the total magnetometer used. If the total-field magnetometer is an Overhauser proton magnetometer or an optical pump magnetometer with measurement accuracy of 0.01 nT or higher, the accuracy of geomagnetic field vector measurement of the present disclosure will be far superior to that of a flux gate three-component magnetometer, whose measurement error may be as large as several tens of nT.

Figure 1:
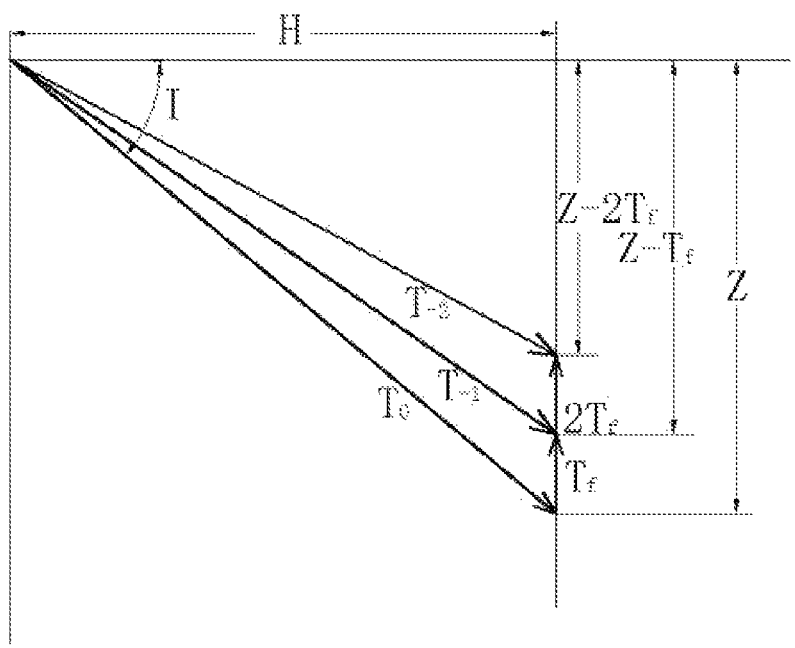
FIG. 1 is a schematic diagram for field measurement of geomagnetic vectors according to an embodiment of the present disclosure; the surface of the figure represents a vertical plane which passes through geomagnetic field vector T and an axial line of the vertical coil; H represents the horizontal component, Z represents the vertical component, $T_f$ and $2T_f$ represent vertical additional magnetic fields with values differing by one time and a direction opposite to the vertical component of the geomagnetic field; $Z-T_f$ represents the vertical component of a composite magnetic field with an additional magnetic field applied reversely; $Z-2T_f$ represents the vertical component of a composite magnetic field with double the additional magnetic field applied reversely; $T_o$ represents a normal geomagnetic field observed when no additional magnetic field is applied; $T_{-1}$ and $T_{-2}$ each represents a composite magnetic fields observed with the additional reverse vertical magnetic field and the double reverse vertical magnetic field applied, respectively.
Figure 2:
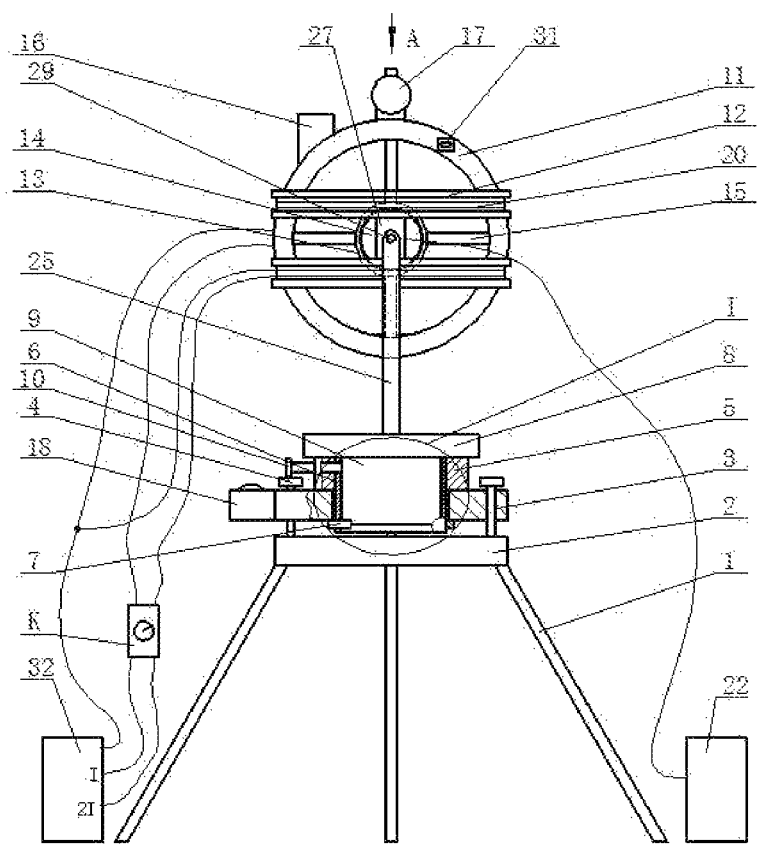
FIG. 2 is a structural diagram of a measurement device for a field measurement method for geomagnetic vectors according to an embodiment of the present disclosure.
Figure 3:
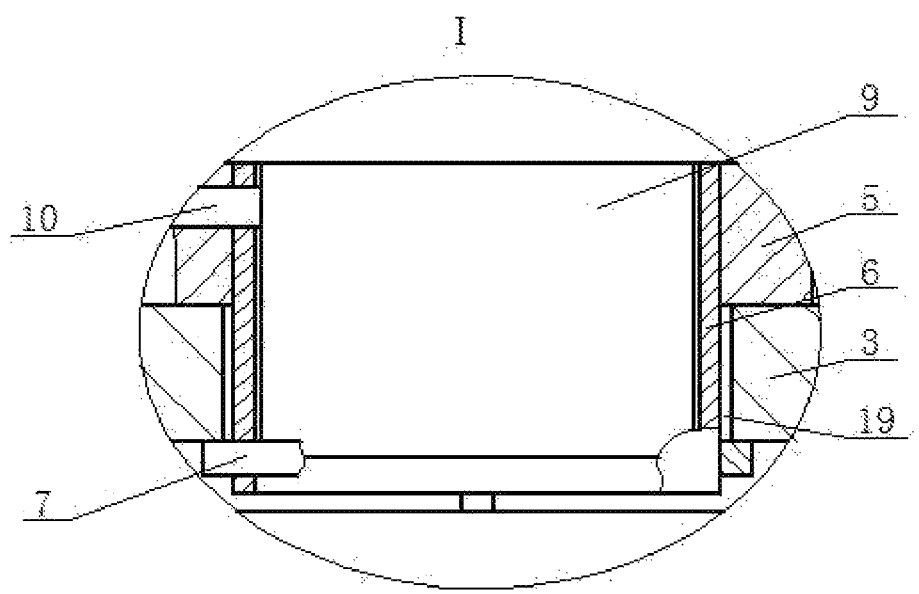
FIG. 3 is an enlarged diagram of portion I of the structural diagram of FIG. 2.
Figure 4:
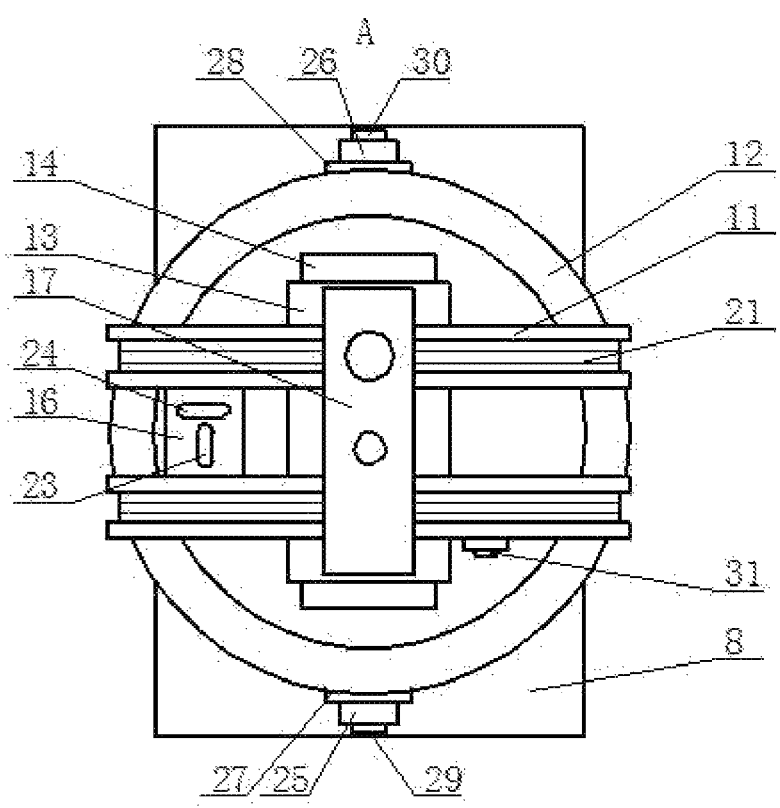
FIG. 4 is a structural diagram showing the measurement device of FIG. 3 when viewed in the A direction of FIG. 3.

Numerals of the figures represent the following: 1: tripod; 2: fixing plate; 3: horizontal dial; 4: adjusting bolt; 5: rotating base; 6: tumbler; 7: fixing nut; 8: coil holder; 9: fixed column; 10: Locking bolt; 11: horizontal coil frame; 12: vertical wire frame; 13: probe fixing barrel; 14: probe of total-field magnetometer; 15: connecting rod; 16: supporting plate; 17: aiming device; 18: glass circular level bubble; 19: through hole; 20: vertical coil; 21: horizontal coil; 22: total-field magnetometer; 23 and 24: glass long level bubbles; 25 and 26: half-shaft brackets; 27 and 28: connecting plates; 29 and 30: half-shafts; 31: level bubble; 32: power supply; K: switch.

DETAILED DESCRIPTION OF THE PREFERRED EMBODIMENTS

A high precision field measurement method for geomagnetic vectors according to the present disclosure may involve the following: using a tripod, a vertical coil and a total-field magnetometer, measure a geomagnetic field $T_0$ without an additional magnetic field imposed; measure two composite magnetic field values $T_{-1}$ and $T_{-2}$ when the geomagnetic field is added with a vertical upward magnetic field $T_f$ and is added with a double vertical upward magnetic field $2T_f$, respectively; and calculate a vertical component Z, a horizontal component H and a geomagnetic inclination I of the geomagnetic field as follows:

$$Z = \frac{T_{-2}^2 - 4T_{-1}^2 + 3T_0^2}{\sqrt{8(T_{-2}^2 - 2T_{-1}^2 + T_0^2)}}$$

$$H = \sqrt{T_0^2 - Z^2}$$

$$\cos(I) = \frac{H}{T_0}$$

A high precision field measurement method for geomagnetic vectors according to the present disclosure may involve the following: set up a horizontal coil, such that a geometric center of the vertical coil coincides with a geometric center of the horizontal coil; use the total-field magnetometer to measure two composite magnetic field values $T_{+\|}$ and $T_{-\|}$ after the geomagnetic field has been added with a horizontal forward magnetic field and a horizontal reverse magnetic field, respectively; and calculate a geomagnetic declination as follows:

$$\cos(D1) = \frac{T^2_{+\|} - T^2_{-\|}}{T_0 \cos(I)\sqrt{8(T^2_{+\|} + T^2_{-\|} - 2T^2_0)}}$$

Geomagnetic declination $D = D0 - D1$:

wherein D0 is an included angle between an axial line of the horizontal coil and a geographical north direction, a known preset value.

The high precision field measurement method for geomagnetic vectors of the present disclosure may involve the following steps:

① Place a probe of the total-field magnetometer inside the vertical coil and mount the vertical coil on the tripod, wherein the vertical coil is a Helmholtz coil;

② Connect the vertical coil to an excitation power supply through a conducting wire, the excitation power supply provided with a wave-band switch thereon;

③ Adjust the switch on the excitation power supply such that the excitation power supply does not power on the vertical coil; and use the total-field magnetometer to measure the geomagnetic field $T_o$ without an additional magnetic field imposed;

④ Adjust the switch on the excitation power supply such that the excitation power supply reversely powers on the vertical coil with a current intensity I, generating inside the vertical coil the vertical upward magnetic field $T_f$; and use the total-field magnetometer to measure the composite magnetic field $T_{-1}$ of the magnetic field $T_f$ and the geomagnetic field;

⑤ Adjust the switch on the excitation power supply such that the excitation power supply reversely powers on the vertical coil with a current intensity 2I, generating inside the vertical coil the vertical upward magnetic field $2T_f$; use the total-field magnetometer to measure the composite magnetic field $T_{-2}$ of the magnetic field $2T_f$ and the geomagnetic field; and, using $T_o$, $T_{-1}$ and $T_{-2}$, calculate the vertical component Z, the horizontal component H and the geomagnetic inclination I of the geomagnetic field as follows:

$$Z = \frac{T^2_{-2} - 4T^2_{-1} + 3T^2_0}{\sqrt{8(T^2_{-2} - 2T^2_{-1} + T^2_0)}}$$

$$H = \sqrt{T^2_0 - Z^2}$$

$$\cos(I) = \frac{H}{T_0}$$

The present disclosure also states the following: mount the horizontal coil on the vertical coil such that the geometric center of the vertical coil coincides with the geometric center of the horizontal coil; place the probe of the total-field magnetometer at a location where the geometric centers of the two coils coincide, wherein the horizontal coil is a Helmholtz coil; use the total-field magnetometer to measure the composite magnetic fields wherein the geomagnetic field has been added with a horizontal forward magnetic field $T_{+\|}$ and a horizontal reverse magnetic field $T_{-\|}$; and calculate the geomagnetic declination as follows:

$$\cos(D1) = \frac{T^2_{+\|} - T^2_{-\|}}{T_0 \cos(I)\sqrt{8(T^2_{+\|} + T^2_{-\|} - 2T^2_0)}}$$

Geomagnetic declination $D = D0 - D1$:

wherein D0 is the included angle between the axial line of the horizontal coil and the geographic north direction, a known preset value.

① Place a probe of the total-field magnetometer inside the vertical coil and mount the vertical coil on the tripod, wherein the vertical coil is a Helmholtz coil;

② Connect the vertical coil to an excitation power supply through conductor conducting wire, the excitation power supply provided with a wave-band switch thereon;

③ Adjust the switch on the excitation power supply such that the excitation power supply does not power on the vertical coil; and use the total-field magnetometer to measure the geomagnetic field $T_o$ without an additional magnetic field imposed;

④ Adjust the switch on the excitation power supply such that the excitation power supply reversely powers on the vertical coil with a current intensity I, generating inside the vertical coil the vertical upward magnetic field $T_f$; and use the total-field magnetometer to measure the composite magnetic field $T_{-1}$ of the magnetic field $T_f$ and the geomagnetic field;

⑤ Adjust the switch on the excitation power supply such that the excitation power supply reversely powers on the vertical coil with a current intensity 2I, generating inside the vertical coil the vertical upward magnetic field $2T_f$; use the total-field magnetometer to measure the composite magnetic field $T_{-2}$ of the magnetic field $2T_f$ and the geomagnetic field; and, using $T_o$, $T_{-1}$ and $T_{-2}$, calculate the vertical component Z, the horizontal component H and the geomagnetic inclination I of the geomagnetic as follows:

$$Z = \frac{T^2_{-2} - 4T^2_{-1} + 3T^2_0}{\sqrt{8(T^2_{-2} - 2T^2_{-1} + T^2_0)}}$$

$$H = \sqrt{T^2_0 - Z^2}$$

$$\cos(I) = \frac{H}{T_0}$$

⑥ Mount a horizontal coil on the vertical coil such that a geometric center of the vertical coil coincides with a geometric center of the horizontal coil, and connect the horizontal coil to the excitation power supply, wherein the horizontal coil is a Helmholtz coil;

⑦ Adjust the switch on the excitation power supply such that the excitation power supply forwardly powers on the horizontal coil and generates a forward magnetic field; and use the total-field magnetometer to measure a composite magnetic field $T_{+\parallel}$ of the forward magnetic field of the horizontal coil and the geomagnetic field;

⑧ Adjust the switch on the excitation power supply such that the excitation power supply reversely powers on the horizontal coil and generates a reverse magnetic field; use the total-field magnetometer to measure a composite magnetic field $T_{-\parallel}$ of the reverse magnetic field of the horizontal coil and the geomagnetic field; and, using the measured values of $T_o$, $T_{-1}$, $T_{-2}$, $T_{+\parallel}$ and $T_{-\parallel}$, calculate a vertical component Z, a horizontal component H, a geomagnetic inclination I and a geomagnetic declination D of the geomagnetic field, as follows:

$$Z = \frac{T_{-2}^2 - 4T_{-1}^2 + 3T_0^2}{\sqrt{8(T_{-2}^2 - 2T_{-1}^2 + T_0^2)}}$$

$$H = \sqrt{T_0^2 - Z^2}$$

$$\cos(I) = \frac{H}{T_0}$$

$$\cos(D1) = \frac{T_{+\parallel}^2 - T_{-\parallel}^2}{T_0 \cos(I)\sqrt{8(T_{+\parallel}^2 + T_{-\parallel}^2 - 2T_0^2)}}$$

Geomagnetic declination $D = D0 - D1$ :

wherein D0 is an included angle between an axial line of the horizontal coil and a geographic north direction, a known preset value.

A device used in the high precision field measurement method for geomagnetic vectors as disclosed by the present disclosure may include a tripod (1); a horizontal dial (3) mounted on the tripod (1); a tumbler (6) mounted on the horizontal dial (3); a fixed column (9) mounted in the tumbler (6); a coil holder (8) mounted on the fixed column (9); two half-shaft brackets mounted on the coil holder (8); two half-shafts each mounted at a top end of a respective one of the two half-shaft brackets; a vertical coil frame (12) connected to each of the two half-shafts via a corresponding connecting plate; a horizontal coil frame (11) connected with the vertical coil frame (12); a horizontal coil (21) wound along the horizontal coil frame (11); a vertical coil (20) wound along the vertical coil frame (12), with geometric centers of the vertical coil (20) and the horizontal coil (21) coinciding with each other; a coil excitation power supply connected to both the vertical coil (20) and the horizontal coil (21) through conducting wires; and a probe (14) connected via a conducting wire to a total-field magnetometer (22), the probe mounted at a location where the geometric centers of the vertical coil (20) and the horizontal coil (21) coincide; glass circular level bubbles (18) are mounted on an outer periphery of the horizontal dial (3).

A preferred embodiment of the device provided by the present disclosure includes: a supporting plate (16) is mounted on the horizontal coil frame (11); two mutually orthogonal long glass level bubbles (23) and (24) are mounted on the supporting plate (16); and a plane on which the two long glass level bubbles are located is parallel with a plane of the vertical coil; a rotating base (5) is mounted at an upper end of the horizontal dial (3) and around an outer periphery of the tumbler (6), with an upper-end surface of the rotating base (5) connected with the coil holder (8), and with a locking bolt (10) mounted on a side surface of the rotating base (5); the vertical coil frame (12) and the horizontal coil frame (11) mounted on the two half-shafts of the coil holder (8) are mutually orthogonal, the coil frames can vertically rotate by 180° around the horizontal half-shafts, and the coil holder (8) can horizontally rotate by 180° around the fixed column (9).

For the high precision field measurement method for geomagnetic vectors as stated in the present disclosure, a preferred integral solution is a measurement method combining a vertical coil and a horizontal coil, which involves the following steps:

① A tripod (1) is mounted on an observation location; a horizontal dial (3) is mounted on the tripod (1); a tumbler (6) is mounted on the horizontal dial (3); a fixed column (9) is mounted in the tumbler (6); a coil holder (8) is mounted on the fixed column (9); two half-shaft brackets are mounted on the coil holder (8); each of two half-shafts is mounted at a top end of a respective one of the two half-shaft brackets; a vertical coil frame (12) is connected to each of the two half-shafts via a corresponding connecting plate; a horizontal coil frame (11) is connected with the vertical coil frame (12); a horizontal coil (21) is wound along the horizontal coil frame (11); a vertical coil (20) is wound along the vertical coil frame (12), with geometric centers of the vertical coil (20) and the horizontal coil (21) coinciding with each other; a coil excitation power supply is connected to both the vertical coil (20) and the horizontal coil (21) through conducting wires; a probe (14) is connected via a conducting wire to a total-field magnetometer (22), and the probe is mounted at a location where the geometric centers of the vertical coil and the horizontal coil coincide;

② Adjust the tripod such that the vertical coil is in a vertical condition and the horizontal coil is in a horizontal condition, wherein an azimuth of the horizontal coil is D0, while both the vertical coil and the horizontal coil are Helmholtz coils;

③ Adjust a switch on excitation power supply such that the excitation power supply does not power on the vertical coil; use the total-field magnetometer to measure a geomagnetic field $T_o$ without an additional magnetic field imposed;

④ Adjust the switch on the excitation power supply such that the excitation power supply reversely powers on the vertical coil with a power supply intensity I, generating inside the vertical coil a vertical upward magnetic field $T_f$; and use the total-field magnetometer to measure a composite magnetic field $T_{-1}$ of the magnetic field $T_f$ and the geomagnetic field;

⑤ Adjust the switch on the excitation power supply such that the excitation power supply reversely powers on the vertical coil with a power supply intensity 2I, generating inside the vertical coil a vertical upward magnetic field $2T_f$; use the total-field magnetometer to measure a composite magnetic field $T_{-2}$ of the magnetic field $2T_f$ and the geomagnetic field; and, using $T_o$, $T_{-1}$ and $T_{-2}$, calculate a vertical component Z, a horizontal component H and a geomagnetic inclination I of the magnetic field as follows:

$$Z = \frac{T_{-2}^2 - 4T_{-1}^2 + 3T_0^2}{\sqrt{8(T_{-2}^2 - 2T_{-1}^2 + T_0^2)}}$$

$$H = \sqrt{T_0^2 - Z^2}$$

$$\cos(I) = \frac{H}{T_0}$$

⑥ Mount the horizontal coil on the vertical coil such that a geometric center of the vertical coil coincides with a geometric center of the horizontal coil, and connect the horizontal coil to the excitation power supply, wherein the horizontal coil is a Helmholtz coil;

⑦ Adjust the switch on the excitation power supply such that the excitation power supply forwardly powers on the horizontal coil and generates a forward magnetic field; and use the total-field magnetometer to measure a composite magnetic field $T_{+\|}$ of the forward magnetic field of the horizontal coil and the geomagnetic field;

⑧ Adjust the switch on the excitation power supply such that the excitation power supply reversely powers on the horizontal coil and generates a reverse magnetic field; use the total-field magnetometer to measure a composite magnetic field $T_{-\|}$ of the reverse magnetic field of the horizontal coil and the geomagnetic field; and, using the measured values of $T_o$, $T_{-1}$, $T_{-2}$, $T_{+\|}$ and $T_{-\|}$, calculate a vertical component Z, a horizontal component H, a geomagnetic inclination I and a geomagnetic declination D of the geomagnetic field, as follows:

$$Z = \frac{T_{-2}^2 - 4T_{-1}^2 + 3T_0^2}{\sqrt{8(T_{-2}^2 - 2T_{-1}^2 + T_0^2)}}$$

$$H = \sqrt{T_0^2 - Z^2}$$

$$\cos(I) = \frac{H}{T_0}$$

$$\cos(D1) = \frac{T_{+//}^2 - T_{-//}^2}{T_0 \cos(I)\sqrt{8(T_{+//}^2 + T_{-//}^2 - 2T_0^2)}}$$

Geomagnetic declination $D = D0 - D1$ :

wherein D0 is an included angle between an axial line of the horizontal coil and a geographic north direction, a known preset value.

According to the high precision field measurement method for geomagnetic vectors of the present disclosure, it is feasible to use only the vertical coil to measure the vertical component Z, the horizontal component H and the geomagnetic inclination I of the geomagnetic field. With the vertical coil and the horizontal coil combined, it is feasible to measure the vertical component Z, the horizontal component H, the geomagnetic inclination I and the geomagnetic declination D of the geomagnetic field.

Embodiment 1

In order to use the device used in the high precision field measurement method for geomagnetic vectors provided by the present disclosure to measure the geomagnetic vectors, mount the tripod in such device at an intended observation location such that a plane of the circular level bubble at the top of the tripod is roughly centered. Adjust the leveling knob of the tripod such that both the vertical and horizontal level bubbles on the vertical coil are centered. Use an aiming device to aim at a direction symbol which is preset on the ground surface according to a profile azimuth angle D0 such that the azimuth of the horizontal coil is D0. The measurement steps are as follows:

① Mount probe 14 that is connected via a conducting wire to total-field magnetometer 22 at a location where the geometric centers of the vertical coil and the horizontal coil coincide;

② Adjust the tripod leveling knob such that the vertical coil is in a vertical state, the horizontal coil is in a horizontal state and the azimuth of horizontal coil is D0;

③ Adjust the switch on the excitation power supply such that the excitation power supply does not power on the vertical coil; use the total-field magnetometer to measure the geomagnetic field $T_o$ without an additional magnetic field;

④ Adjust the switch on the excitation power such that the excitation power supply reversely powers on the vertical coil with a current intensity I, generating inside the vertical coil a vertical upward magnetic field $T_f$, and use the total-field magnetometer to measure the composite magnetic field $T_{-1}$ of the magnetic field $T_f$ and the geomagnetic field;

⑤ Adjust the switch on the excitation power such that the excitation power supply reversely powers on the vertical coil with a current intensity 2I, generating inside the vertical coil a vertical upward magnetic field $2T_f$; use the total-field magnetometer to measure the composite magnetic field $T_{-2}$ of the magnetic field $2T_f$ and the geomagnetic field; and, using $T_o$, $T_{-1}$ and $T_{-2}$, calculate the vertical component Z, the horizontal component H and the geomagnetic inclination I of the geomagnetic field as follows:

$$Z = \frac{T_{-2}^2 - 4T_{-1}^2 + 3T_0^2}{\sqrt{8(T_{-2}^2 - 2T_{-1}^2 + T_0^2)}}$$

$$H = \sqrt{T_0^2 - Z^2}$$

$$\cos(I) = \frac{H}{T_0}$$

⑥ Mount the horizontal coil on the vertical coil such that a geometric center of the vertical coil coincides with a geometric center of the horizontal coil, and connect the horizontal coil to the excitation power supply, wherein the horizontal coil is a Helmholtz coil;

⑦ Adjust the switch on the excitation power supply such that the excitation power supply forwardly powers on the horizontal coil and generates a forward magnetic field; and use the total-field magnetometer to measure a composite magnetic field $T_{+\|}$ of the forward magnetic field of the horizontal coil and the geomagnetic field;

⑧ Adjust the switch on the excitation power supply such that the excitation power supply reversely powers on the horizontal coil and generates a reverse magnetic field; use the total-field magnetometer to measure a composite magnetic field $T_{-\|}$ of the reverse magnetic field of the horizontal coil and the geomagnetic field; and, using the measured values of $T_o$, $T_{-1}$, $T_{-2}$, $T_{+\|}$ and $T_{-\|}$, calculate a vertical component Z, a horizontal component H, a geomagnetic inclination I and a geomagnetic declination D of the geomagnetic field, as follows:

$$Z = \frac{T_{-2}^2 - 4T_{-1}^2 + 3T_0^2}{\sqrt{8(T_{-2}^2 - 2T_{-1}^2 + T_0^2)}}$$

$$H = \sqrt{T_0^2 - Z^2}$$

$$\cos(I) = \frac{H}{T_0}$$

$$\cos(D1) = \frac{T_{+//}^2 - T_{-//}^2}{T_0 \cos(I)\sqrt{8(T_{+//}^2 + T_{-//}^2 - 2T_0^2)}}$$

Geomagnetic declination $D = D0 - D1$ :

wherein D0 is an included angle between an axial line of the horizontal coil and a geographic north direction, a known preset value. This completes the measurement of the geomagnetic field components at this measuring point. Repeat the said steps to complete the measurement at a next measuring point.

Both the vertical coil and the horizontal coil are Helmholtz coils.

To reduce the influence of azimuth error and leveling error, it is feasible to rotate the coil holder by 180° horizontally and repeat the adjusting of the excitation power switch such that the excitation power supply reversely powers on the vertical coil and subsequently reversely applies 2 times the current on the vertical coil. The resulted composite magnetic fields, $T_{-1}$ and $T_{-2}$, of each of the two reverse magnetic fields and the geomagnetic field are then respectively measured using the total-field magnetometer. It is also feasible to rotate the horizontal coil by 180° vertically and repeat the adjusting of the excitation power switch such that the excitation power supply forwardly and reversely powers on the horizontal coil, respectively. The resulted composite magnetic fields, $T_{+\|}$ and $T_{-\|}$, of each of the forward and reverse magnetic fields and the geomagnetic field are then respectively measured using a total-field magnetometer. The measured values are then averaged with the values measured prior to the rotations and taken as the measurement result.

Embodiment 2

In order to use the device used in the high precision field measurement method for geomagnetic vectors provided by the present disclosure to measure the geomagnetic vectors, mount the tripod in such device at an intended observation location such that a plane of the circular level bubble at the top of the tripod is roughly centered. Adjust the leveling knob of the tripod such that both the vertical and horizontal level bubbles on the vertical coil are centered. Maintain the axial line of the vertical coil in a vertical state. The measurement steps are as follows:

① Place a probe of the total-field magnetometer inside the vertical coil and mount the vertical coil on the tripod, wherein the vertical coil is a Helmholtz coil;

② Connect the vertical coil to an excitation power supply through a conducting wire, the excitation power supply provided with a wave-band switch thereon;

③ Adjust the switch on the excitation power supply such that the excitation power supply does not power on the vertical coil; and use the total-field magnetometer to measure the geomagnetic field $T_o$ without an additional magnetic field imposed;

④ Adjust the switch on the excitation power supply such that the excitation power supply reversely powers on the vertical coil with a current intensity I, generating inside the vertical coil the vertical upward magnetic field $T_f$; and use the total-field magnetometer to measure the composite magnetic field $T_{-1}$ of the magnetic field $T_f$ and the geomagnetic field;

⑤ Adjust the switch on the excitation power supply such that the excitation power supply reversely powers on the vertical coil with a current intensity 2I, generating inside the vertical coil the vertical upward magnetic field $2T_f$; use the total-field magnetometer to measure the composite magnetic field $T_{-2}$ of the magnetic field $2T_f$ and the geomagnetic field; and, using $T_o$, $T_{-1}$ and $T_{-2}$, calculate the vertical component Z, the horizontal component H and the geomagnetic inclination I of the geomagnetic field as follows:

$$Z = \frac{T_{-2}^2 - 4T_{-1}^2 + 3T_0^2}{\sqrt{8(T_{-2}^2 - 2T_{-1}^2 + T_0^2)}}$$

$$H = \sqrt{T_0^2 - Z^2}$$

$$\cos(I) = \frac{H}{T_0}$$

This completes the measurement of the geomagnetic field components at this measuring point. Repeat the said steps to complete the measurement at a next measuring point.

To reduce the influence of azimuth error and leveling error, it is feasible to rotate the coil holder by 180° horizontally and repeat the adjusting of the excitation power switch such that the excitation power supply reversely powers on the vertical coil. The resulted composite magnetic field, $T_{-1}$, of the reverse magnetic field and the geomagnetic field is measured using the total-field magnetometer. Subsequently, adjust the excitation power switch such that the excitation power supply reversely powers on the vertical coil with twice the current. The resulted composite magnetic field, $T_{-2}$, of the reverse magnetic field and the geomagnetic field is measured using the total-field magnetometer. Averaged values can be taken as the measurement result.

The principle for geomagnetic vector measurement using the measurement method of the present disclosure is shown in FIG. 1. The principle of the method for calculating the vertical component Z, horizontal component H, geomagnetic inclination I and geomagnetic declination D of geomagnetic field is as follows: at a probe of a total-field magnetometer, respectively apply magnetic fields with a direction opposite to the vertical component of geomagnetic field and intensity values of $T_f$ and $2T_f$. Use the total-field magnetometer to respectively measure a geomagnetic field $T_o$ where no additional magnetic field is provided, a composite magnetic field $T_{-1}$ where magnetic field $T_f$ is added, as well as a composite magnetic field $T_{-2}$ where magnetic field $2T_f$ is added. The values of the aforementioned magnetic fields would satisfy the following set of equations (FIG. 1):

$$T_{-1}^2 = H^2 + (Z - T_f)^2$$
$$T_{-2}^2 = H^2 + (Z - T_f)^2$$
$$T_0^2 = H^2 + Z^2$$
$$\sin(I) = \frac{Z}{T_0}$$

The following can be obtained by solving the set of equations:

$$Z = \frac{T_{-2}^2 - 4T_{-1}^2 + 3T_0^2}{\sqrt{8(T_{-2}^2 - 2T_{-1}^2 + T_0^2)}}$$

$$\sin(I) = \frac{Z}{T_0}$$

$$H = \sqrt{T_0^2 - Z^2}$$

In middle- and high-latitude regions, the normal geomagnetic inclination is relatively higher, and the influence on the magnetic inclination from an additional magnetic field in the vertical direction is relatively reduced. By using the additional reverse vertical magnetic field and the additional double reverse vertical magnetic field, it is feasible to effectively improve the effect of the vertical additional magnetic fields.

$T_{+\parallel}$ represents the composite magnetic field observed with a forward horizontal magnetic field is added, and $T_{-\parallel}$ represents the composite magnetic field observed with a reverse horizontal magnetic field is added. The axial line of the horizontal coil is oriented in an arbitrary but known direction D0. Through a similar analysis as the three-dimensional geometric analysis as illustrated in FIG. 1, it is feasible to derive the following:

$$\cos(D1) = \frac{T_{+\parallel}^2 - T_{-\parallel}^2}{T_0 \cos(I) \sqrt{8(T_{+\parallel}^2 + T_{-\parallel}^2 - 2T_0^2)}};$$

Geomagnetic declination $D = D0 - D1$:

wherein D0 is the included angle between the axial line of the horizontal coil and the geographic north direction, a known preset value.

$T_0$ represents the normal geomagnetic field observed when no additional magnetic field is applied;

$T_{-1}$ represents the composite magnetic field measured by the total-field magnetometer when the vertical coil is reversely excited;

$T_{-2}$ represents the composite magnetic field measured by the total-field magnetometer when the vertical coil is two times reversely excited;

$T_{+\parallel}$ represents the composite magnetic field measured by the total-field magnetometer when the horizontal coil is forwardly excited;

$T_{-\parallel}$ represents the composite magnetic field measured by the total-field magnetometer when the horizontal coil is reversely excited.

The coil excitation power supply described in the present disclosure is able to provide a stable current of 1-100 mA, generating a magnetic field of 100-2000 nT in the coils. The total-field magnetometer can be an optical pump magnetometer, an Overhauser proton magnetometer or a common proton magnetometer.

In the method described in the present disclosure, the measurement of $T_o$, $T_{-1}$, $T_{-2}$, $T_{+\parallel}$ and $T_{-\parallel}$ may also be controlled and completed by using a single chip and programmed control circuits that automatically and sequentially perform and complete the calculation of the geomagnetic field components after the measurement.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A high precision field measurement method for geomagnetic vectors, the method comprising:

using a tripod, a vertical coil and a total-field magnetometer to measure a geomagnetic field $T_0$ without an additional magnetic field imposed;

measuring two composite magnetic field values $T_{-1}$ and $T_{-2}$ when the geomagnetic field is added with a vertical upward magnetic field $T_f$ and is added with a double vertical upward magnetic field $2T_f$, respectively;

calculating a vertical component Z, a horizontal component H and a geomagnetic inclination I of the geomagnetic field as follows:

$$Z = \frac{T_{-2}^2 - 4T_{-1}^2 + 3T_0^2}{\sqrt{8(T_{-2}^2 - 2T_{-1}^2 + T_0^2)}}$$

$$H = \sqrt{T_0^2 - Z^2}$$

$$\cos(I) = \frac{H}{T_0};$$

setting up a horizontal coil such that a geometric center of the vertical coil coincides with a geometric center of the horizontal coil;

using the total-field magnetometer to measure two composite magnetic field values $T_{+\parallel}$ and $T_{-\parallel}$ after the geomagnetic field has been added with a horizontal forward magnetic field and a horizontal reverse magnetic field, respectively; and calculating a geomagnetic declination as follows:

$$\cos(D1) = \frac{T_{+//}^2 - T_{-//}^2}{T_0\cos(I)\sqrt{8(T_{+//}^2 + T_{-//}^2 - 2T_0^2)}}$$

Geomagnetic declination $D = D0 - D1$:

wherein D0 is an included angle between an axial line of the horizontal coil and a geographical north direction, a known preset value.

2. The high precision field measurement method for geomagnetic vectors of claims 1, the method further comprising:

mounting the horizontal coil on the vertical coil such that the geometric center of the vertical coil coincides with the geometric center of the horizontal coil;

placing the probe of the total-field magnetometer at a location where the geometric centers of the two coils coincide, wherein the horizontal coil is a Helmholtz coil;

using the total-field magnetometer to measure the composite magnetic fields wherein the geomagnetic field has been added with a horizontal forward magnetic field $T_{+\parallel}$ and a horizontal reverse magnetic field $T_{-\parallel}$; and calculating the geomagnetic declination as follows:

$$\cos(D1) = \frac{T_{+//}^2 - T_{-//}^2}{T_0\cos(I)\sqrt{8(T_{+//}^2 + T_{-//}^2 - 2T_0^2)}}$$

Geomagnetic declination $D = D0 - D1$:

wherein D0 is the included angle between the axial line of the horizontal coil and the geographic north direction, a known preset value.

3. A high precision field measurement method for geomagnetic vectors, the method comprising:

using a tripod, a vertical coil and a total-field magnetometer to measure a geomagnetic field $T_0$ without an additional magnetic field imposed;

measuring two composite magnetic field values $T_{-1}$ and $T_{-2}$ when the geomagnetic field is added with a vertical upward magnetic field $T_f$ and is added with a double vertical upward magnetic field $2T_f$, respectively; and calculating a vertical component Z, a horizontal component H and a geomagnetic inclination I of the geomagnetic field, wherein the method comprises the following steps:

placing a probe of the total-field magnetometer inside the vertical coil and mounting the vertical coil on the tripod, wherein the vertical coil is a Helmholtz coil;

connecting the vertical coil to an excitation power supply through a conducting wire, the excitation power supply provided with a wave-band switch thereon;

adjusting the switch on the excitation power supply such that the excitation power supply does not power on the vertical coil, and using the total-field magnetometer to measure the geomagnetic field $T_o$ without an additional magnetic field imposed;

adjusting the switch on the excitation power supply such that the excitation power supply reversely powers on the vertical coil with a current intensity I, generating inside the vertical coil the vertical upward magnetic field $T_f$, and using the total-field magnetometer to measure the composite magnetic field $T_{-1}$ of the magnetic field $T_f$ and the geomagnetic field; and adjusting the switch on the excitation power supply such that the excitation power supply reversely powers on the vertical coil with a current intensity 2I, generating inside the vertical coil the vertical upward magnetic field $2T_f$, using the total-field magnetometer to measure the composite magnetic field $T_{-2}$ of the magnetic field $2T_f$ and the geomagnetic field; and using $T_o$, $T_{-1}$ and $T_{-2}$ to calculate the vertical component Z, the horizontal component H and the geomagnetic inclination I of the geomagnetic field as follows:

$$Z = \frac{T_{-2}^2 - 4T_{-1}^2 + 3T_0^2}{\sqrt{8(T_{-2}^2 - 2T_{-1}^2 + T_0^2)}}$$

$$H = \sqrt{T_0^2 - Z^2}$$

$$\cos(I) = \frac{H}{T_0}.$$

4. The high precision field measurement method for geomagnetic vectors of claim 3, further comprising the following steps:

mounting a horizontal coil on the vertical coil such that a geometric center of the vertical coil coincides with a geometric center of the horizontal coil, and connecting the horizontal coil to the excitation power supply, wherein the horizontal coil is a Helmholtz coil;

adjusting the switch on the excitation power supply such that the excitation power supply forwardly powers on the horizontal coil and generates a forward magnetic field, and using the total-field magnetometer to measure a composite magnetic field $T_{+\|}$ of the forward magnetic field of the horizontal coil and the geomagnetic field;

adjusting the switch on the excitation power supply such that the excitation power supply reversely powers on the horizontal coil and generates a reverse magnetic field, using the total-field magnetometer to measure a composite magnetic field $T_{-\|}$ of the reverse magnetic field of the horizontal coil and the geomagnetic field, and using the measured values of $T_o$, $T_{-1}$, $T_{-2}$, $T_{+\|}$ and $T_{-\|}$ to calculate a geomagnetic declination D of the geomagnetic field, as follows:

$$Z = \frac{T_{-2}^2 - 4T_{-1}^2 + 3T_0^2}{\sqrt{8(T_{-2}^2 - 2T_{-1}^2 + T_0^2)}}$$

$$H = \sqrt{T_0^2 - Z^2}$$

$$\cos(I) = \frac{H}{T_0}$$

$$\cos(D1) = \frac{T_{+\|}^2 - T_{-\|}^2}{T_0 \cos(I)\sqrt{8(T_{+\|}^2 + T_{-\|}^2 - 2T_0^2)}}$$

Geomagnetic declination $D = D0 - D1$:

wherein D0 is an included angle between an axial line of the horizontal coil and a geographic north direction, a known preset value.

5. A device for high precision field measurement of geomagnetic vectors, comprising:
a tripod;
a horizontal dial mounted on the tripod;
a tumbler mounted on the horizontal dial;
a fixed column mounted in the tumbler;
a coil holder mounted on the fixed column;
two half-shaft brackets mounted on the coil holder;
two half-shafts each mounted at a top end of a respective one of the two half-shaft brackets;
a vertical coil frame connected to each of the two half-shafts via a corresponding connecting plate;
a horizontal coil frame connected with the vertical coil frame;
a horizontal coil wound along the horizontal coil frame;
a vertical coil wound along the vertical coil frame, with geometric centers of the vertical coil and the horizontal coil coinciding with each other;
a coil excitation power supply connected to both the vertical coil and the horizontal coil through conducting wires; and
a probe connected via a conducting wire to a total-field magnetometer, the probe mounted at a location where the geometric centers of the vertical coil and the horizontal coil coincide.

6. The device for high precision field measurement of geomagnetic vectors of claim 5, further comprising:
a supporting plate mounted on the horizontal coil frame;
two mutually orthogonal long glass level bubbles mounted on the supporting plate; and
a plane on which the two long glass level bubbles are located is parallel with a plane of the vertical coil.

7. The device for high precision field measurement of geomagnetic vectors of claim 5, further comprising:
a rotating base mounted at an upper end of the horizontal dial and around an outer periphery of the tumbler, with an upper-end surface of the rotating base connected with the coil holder, and with a locking bolt mounted on a side surface of the rotating base.

8. The device for high precision field measurement of geomagnetic vectors of claim 5, wherein the vertical coil frame and the horizontal coil frame mounted on the two half-shafts of the coil holder are mutually orthogonal, wherein the coil frames can vertically rotate by 180° around the horizontal half-shafts, and wherein the coil holder can horizontally rotate by 180° around the fixed column.

\* \* \* \* \*